Nov. 24, 1964  R. COVER  3,158,156
CORN HUSKING MACHINE
Filed July 2, 1962  12 Sheets-Sheet 1

INVENTOR
RALPH COVER

BY Mason, Porter, Diller & Stewart
ATTORNEYS

Nov. 24, 1964  R. COVER  3,158,156
CORN HUSKING MACHINE
Filed July 2, 1962  12 Sheets-Sheet 10

INVENTOR
RALPH COVER
BY
ATTORNEYS

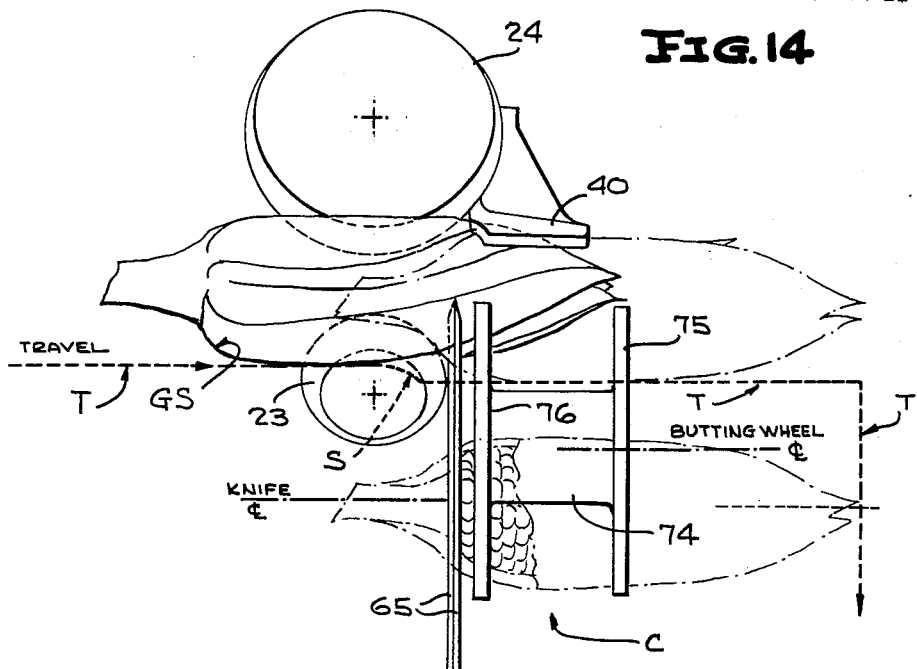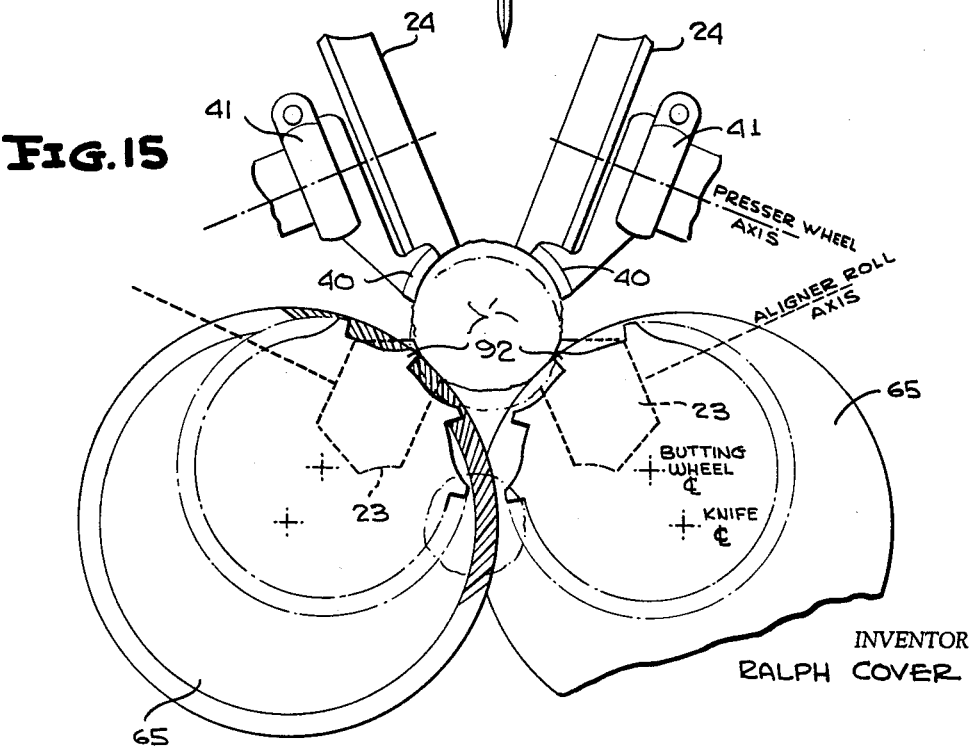

Nov. 24, 1964  R. COVER  3,158,156
CORN HUSKING MACHINE
Filed July 2, 1962  12 Sheets-Sheet 12

INVENTOR
RALPH COVER
BY
Mason, Porter, Diller & Stewart
ATTORNEYS

United States Patent Office 3,158,156
Patented Nov. 24, 1964

3,158,156
CORN HUSKING MACHINE
Ralph Cover, P.O. Box 390, Westminster, Md.
Filed July 2, 1962, Ser. No. 206,585
32 Claims. (Cl. 130—5)

The invention relates generally to apparatus for preparing green corn for processing or related uses and primarily seeks to provide new and improved machine structures effective to very rapidly and efficiently debut the corn ears and remove the husks therefrom, without slitting or ruffling the husks or tumbling or otherwise handling the rapidly travelling corn ears in a manner for damaging the grain kernels.

Corn husking machines are known and have provided marked advances in the art but such known machines have not provided the perfection in operation and accomplishment which is attainable in this art and have presented a number of problems and deficiencies which have been solved in the machine which is the subject of this disclosure. For example, feed-in guides formerly used were provided in multiple piece arrangement and there were resultant jammings of rapidly feeding corn ears, and machine stoppages. There were multiple and complicated feed speed changes in the infeeding of the corn ears and this not only added to production costs but also to the problems of accurately controlling procedure of the corn ears through the machine and handling thereof without loss due to grain damage. As many as six slitters formerly were used for slitting the corn ear husks longitudinally and/or crosswise or laterally as the longitudinal movement of the corn ears was in progress, and special devices for ruffling the husks on the corn ears prior to the actual husking operation were employed, such slitting and ruffling actions often resulting in grain damage. A serious problem was presented by accumulation of husk ribbons and corn silk on and about machine parts disposed between the corn ear debutting devices and the husking rolls, and machine attendants spent much time in the necessary clearing of such debris. Another very serious problem was presented because of loss of control over the corn ears in passage from the debutting devices to the husking rolls, resulting in turning and tumbling about of the corn ears before and after entry upon the husking rolls, frequent damaging of grain rows on the corn ears and occasional machine jamming, and in at least one type of machine, a necessity for provision of special vibratory hopper wall means extending along full length beside the husking rolls.

It is a primary purpose of the present invention to provide a new and improved corn husking machine wherein the above mentioned problems have been solved and the corn ear debutting and husking operations are accomplished in a more rapid and efficient manner than has been possible heretofore.

An object of the invention is to provide an improved corn husking machine wherein the corn ears are received and fed rapidly along in processional order and in horizontal, generally longitudinal alignment with their supported diameter bottoms substantially on a common plane, to a position over debutting wheels and debutting knives, the wheels immediately grasping each ear as it is presented thereover and bringing about a substantially right angular change in its travel course, from horizontal-longitudinal to vertical-transverse, and passing it through the debutting knives and onto fall controlling and guide means effective to very accurately and gently place each ear, tip first and at a slight forwardly and downwardly inclined relation directly into the "bite" or center line between a cooperating pair of longitudinally disposed husking rolls.

Another object of the invention is to provide a husking machine of the character stated wherein the means for feeding the corn ears and presenting them one-by-one into position over the debutting wheel and knife arrangement includes corn ear supporting and feeding chain means, laterally spaced and angularly disposed feed roll means, laterally spaced and angularly disposed aligner and presser roll means, laterally spaced and opposing pairs of corn ear presser and retarder plates, and a single piece guide extending a considerable distance along the feed-in chain at each side thereof over the feed roll and aligner roll means and at least in part overlapping the presser wheel at the particular side so as to assure smooth feeding of the corn ears without any obstructions or stoppages such as were experienced previously.

Another object of the invention is to provide a husking machine structure of the character stated wherein only two-speed feeding and presentation of the corn ears is provided for, namely, the speed of the chain means and feed roll means, and the faster speed of the aligner and presser roll means and the debutting wheels, all of said roll means and wheels being driven at substantially the same peripheral speed.

Another object of the invention is to provide a husking machine of the character stated wherein the presser wheel means is mounted for movement upwardly and downwardly in accordance with variations in the cross sections of corn ears engaging between them and the cooperating aligner roll means, the presser plates being supported by and movable with the presser wheel means, and retarder plates acting when a corn ear engages between them and the overlying presser plates to tend to hold the ear back against the aligner roll means and cause its grain shoulder at the butt end to tend to follow a very short distance along the circumference of said roll means with an attendant lowering of the presser wheel means and presser plates with the latter imparting downward movement to the corn ear in its horizontal position, and there being included means for causing the aligner roll means to move apart and toward each other correspondingly as the presser roll means moves up and down in compensation for varying corn ear cross sections, the presser plates and retarder plates being disposed in cooperative relation to the debutting wheels and knvies immediately beyond the aligner roll means and said wheels being spaced farther apart than in previously known machines and, with the knives, placed higher than in known machines so that the wheels are engageable at relatively high side points on each corn ear regardless of ear size, and said presser and aligner roll moving means being so correlated as to permit a limited amount of said imparting of downward movement to the corn ear by the presser plates incidental to said very short distance following of the corn ear grain shoulder along the aligner roll means unattended by substantial change in position of the aligner roll means, and said very short distance of corn ear depression by the presser plates being sufficient to present the corn ear to the high placed debutting wheels so that they will immediatel take over vertical-transverse feeding of the corn ear down through the debutting knives without any substantial prior deviation of the horizontal corn ear from its feed-in plane level.

Another object of the invention is to provide a husking machine of the character stated wherein each debutting wheel means comprises a pair of parallel spaced disks for engaging the corn ears in transverse planes spaced along each ear presented thereto, one disk being placed adjacent the debutting knives toward the butt or trailing end of the ear, each wheel disk having a plurality of corn ear engaging teeth projecting radially therefrom and spaced circumferentially about the same, the portion of each tooth disposed to trail in the direction of rotation merging into the disk through a large radius curve serving as a tooth penetration depth limiting, corn ear contacting guard.

Another object of the invention is to provide a husking machine including a debutting wheel of the character stated wherein the corn ear engaging teeth of the disk nearest the debutting knives lead the teeth on the other disk so as to be engageable with a corn ear slightly in advance of engagement thereof of the teeth of said other disk.

Another object of the invention is to provide a husking machine of the character stated wherein the debutted corn ears are rapidly fed downwardly in horizontal position by the debutting wheel means, being received on an inclined chute and delivered thereby onto the husking rolls, there also being included means adjacent the end of the chute remote from said rolls to receive the butts, and means for preventing accumulation of husk ribbons and corn silk.

Another object of the invention is to provide a husknig machine of the character stated wherein the means for preventing accumulation of husk ribbons and corn silk comprise oscillating inverted V-shaped diverters placed at opposite sides of the chute beneath the debutting knives, and generally horizontally disposed oscillating finger means.

Another object of the invention is to provide a husking machine of the character stated wherein the oscillating finger means is carried by and movable with the inverted V-shaped diverters.

Yet another object of the invention is to provide a husking machine of the character stated wherein the corn ears rapidly delivered downwardly in horizontal position by the debutting wheel means fall into receiving and directing means in the form of downwardly and inwardly converging director walls terminating in close proximity to the inclined chute which delivers onto the husking rolls and spaced sufficiently at their corn ear delivery portions to permit the largest corn ears being husked to pass therebetween onto the chute.

A further object of the invention is to provide debutted corn ear directing means of the character stated wherein each lower or delivery end of a director wall terminates in an inwardly directed relatively yieldable delivery flange, said flanges being disposed in generally parallel spaced relation.

A still further object of the invention is to provide debutted corn ear directing means of the character stated wherein each director wall is rapidly oscillated so that it will engage each falling corn ear a number of times during its descent toward the inclined chute, lightly patting and directing the progress of the rapid fall, the converging placement and shaping of the director walls and the delivery flanges combining with natures grain cushioning husks in delivering the corn ears, accurately and without any possible damaging of grain rows, onto the receiving chute which in turn directs the ears in slight forward and downward inclination, tip first onto the husking rolls at the receiving ends thereof and directly into the "bite" of said rolls so that the husking action is immediate and each ear goes on its way before there is any possibility whatever of a next feeding ear to fall thereon or even contact the same and cause any deflection thereof from its axial discharge course along and off the rolls.

Yet another object of the invention is to provide a novel method of directing the debutted corn ears to the husking rolls, in the manner above stated.

With the above and other objects in view that will hereinafter appear, the nature of the invention will be more clearly understood by reference to the following detailed description, the appended claims and the several views illustrated in the accompanying drawings.

Figure 6:
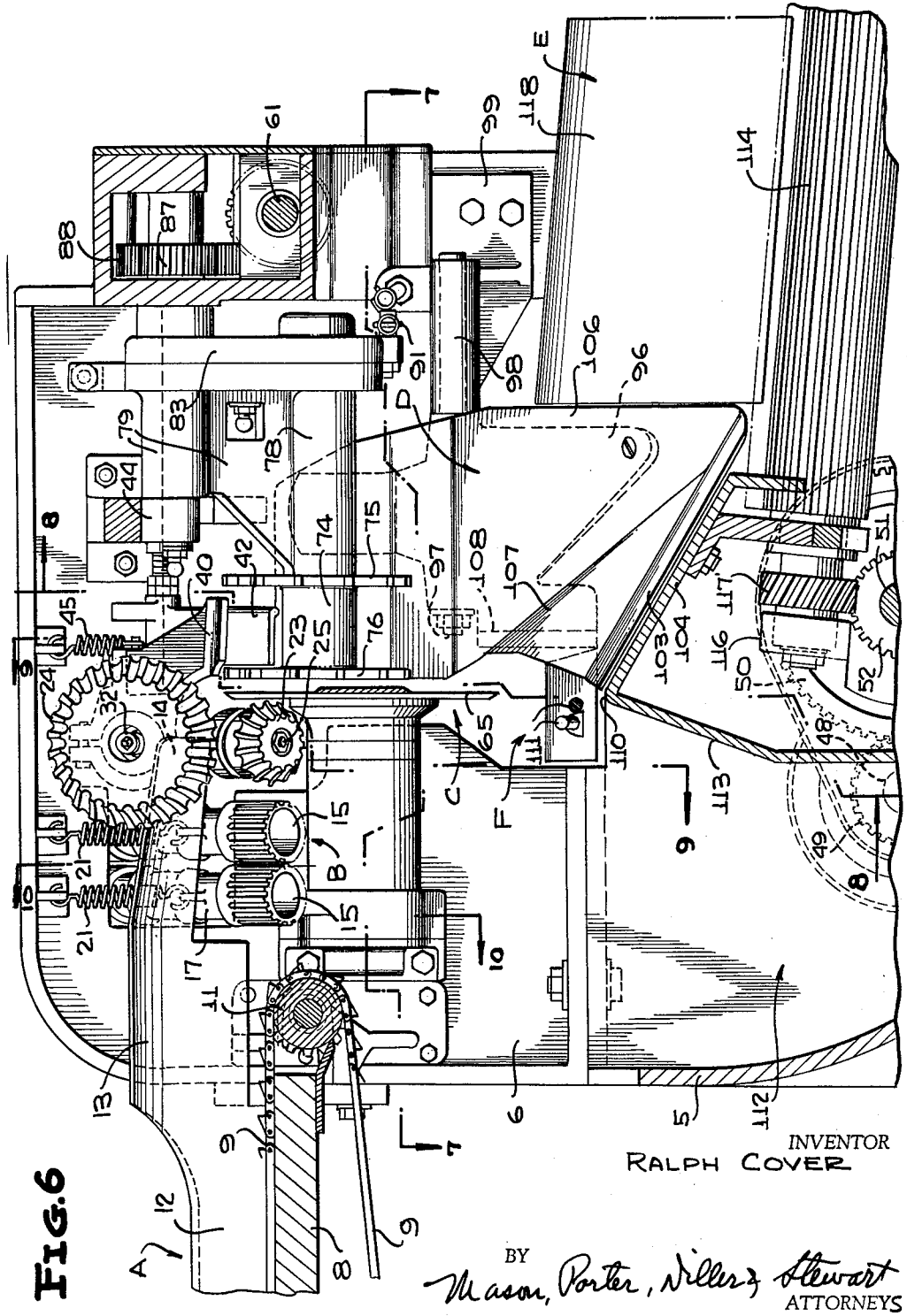
FIGURE 6 is an enlarged vertical longitudinal section taken on the line 6—6 on FIGURE 3.
Figure 8:
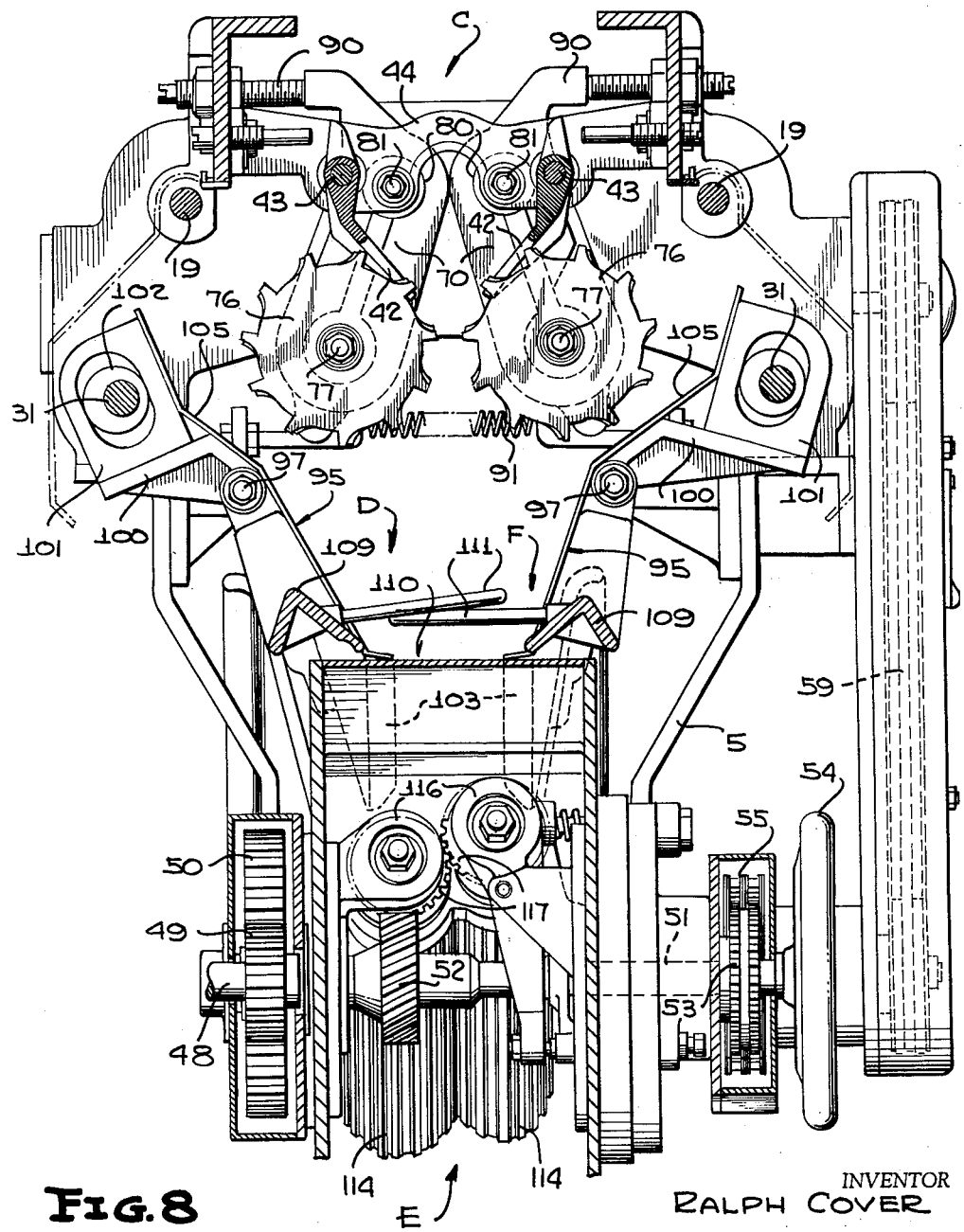
Figure 9:
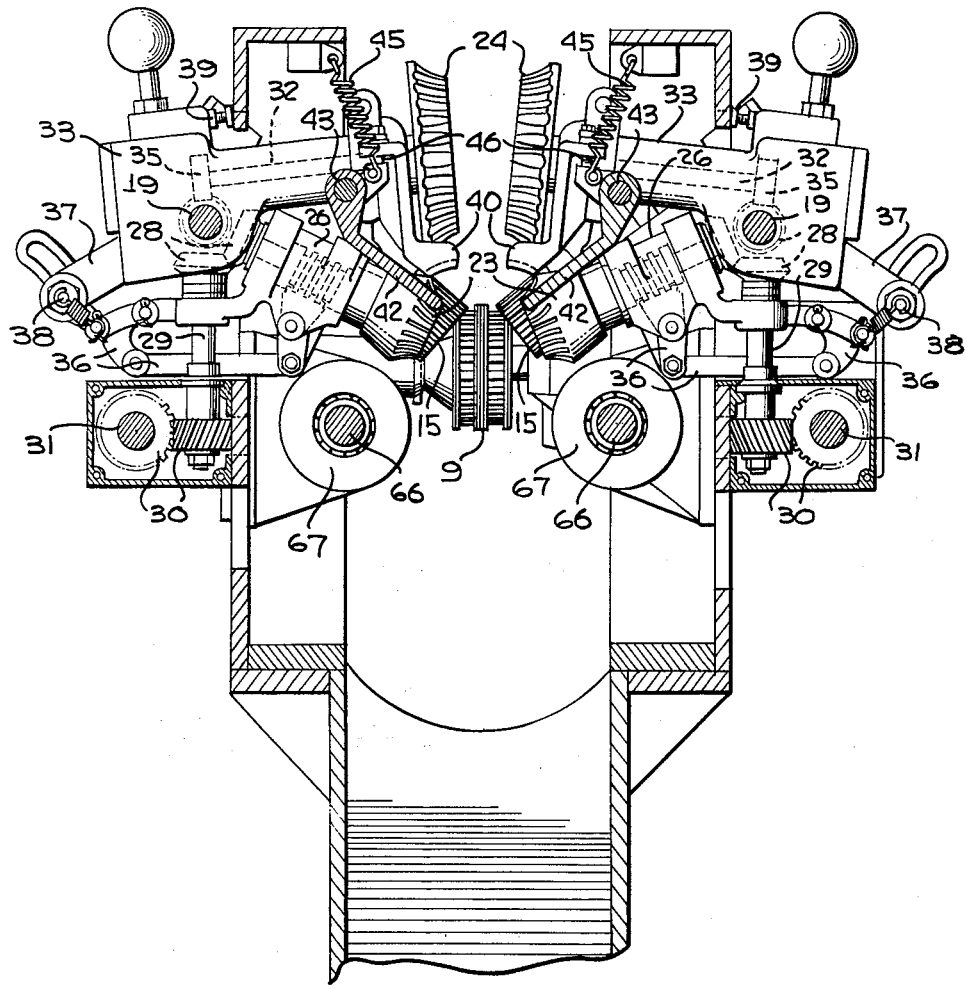

FIGURES 8 and 9 are enlarged vertical cross-sectional views taken on the lines 8—8 and 9—9 respectively on FIGURE 6.

Figure 10:
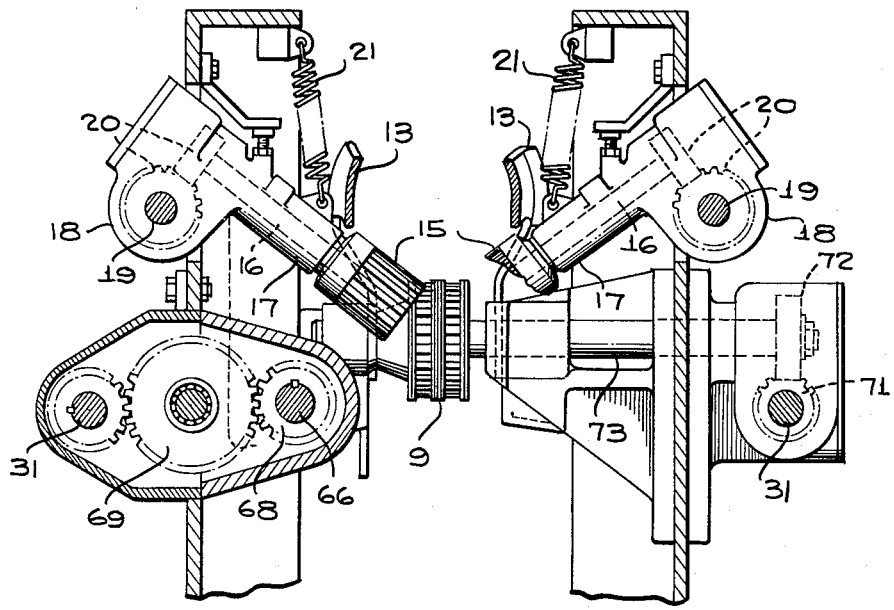

FIGURE 10 is an enlarged fragmentary vertical cross-section taken on the line 10—10 on FIGURE 6.

Figure 11:
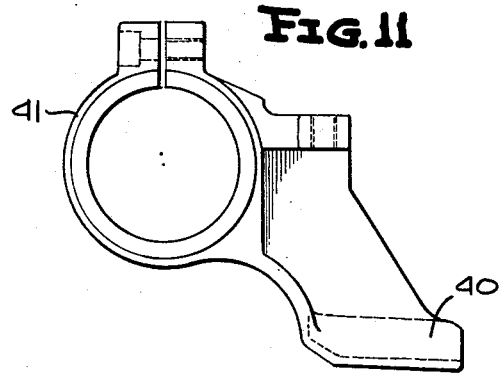

FIGURE 11 is an outside side elevation of one of the presser wheel assembly carried presser plates.

Figure 12:
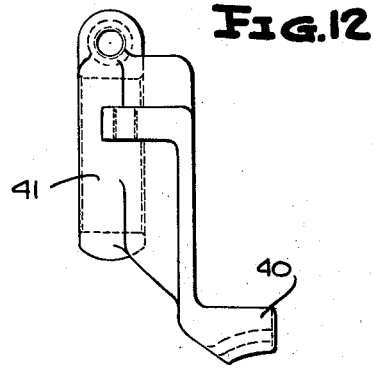
Figure 13:
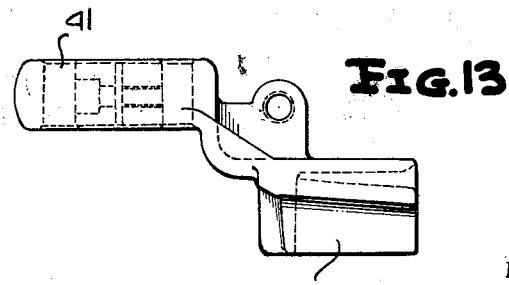

FIGURE 12 is a right end elevation, and FIGURE 13 is an inverted plan of the presser plate shown in FIGURE 11.

FIGURE 14 is a somewhat schematic view showing the relation of cooperating aligner roll means, presser roll means, debutting wheel and knife means, and the travel path of corn ears passing therethrough.

FIGURE 15 is a somewhat schematic vertical cross-sectional view of the parts shown in FIGURE 14 and looking toward the oncoming tip end of an ear of corn, the point of first contact of the wheels in taking over the control of the corn ear movement being shown in full lines, and as in progress in dot and dash lines.

Figure 16:
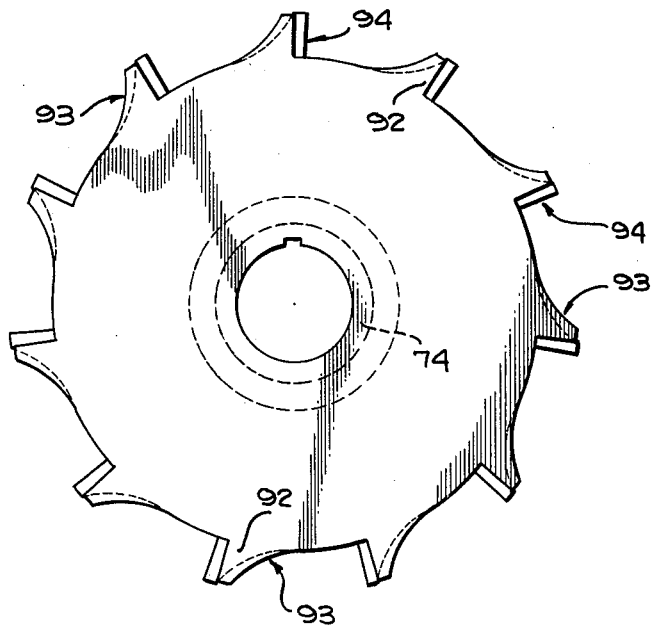

FIGURE 16 is a face view of one of the debutting wheels.

Figure 17:
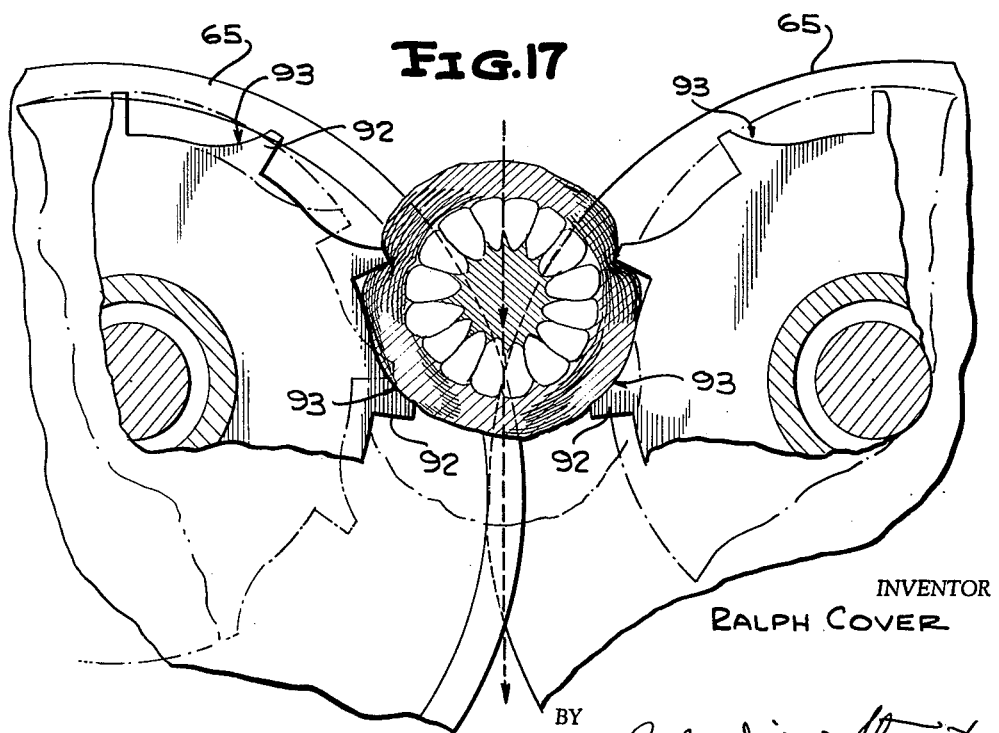

FIGURE 17 is an enlarged fragmentary cross-sectional view illustrating the manner in which the debutting wheels support and prevent damaging contact of the corn ears during the downward movement thereof through the debutting knives.

The new and improved husking machine herein disclosed includes a straight line feed-in section A wherein the corn ears are fed tip end first along their longitudinal axes, and in processional order, to a roll feed and corn ear aligning station or section B whereat the before mentioned direction of feed is maintained and the feeding of the corn ears is increased in speed so as to step the ears apart and assure against any overlapping of portions thereof.

At the section B the corn ears are delivered one-by-one and without any substantial deviation from their horizontal path or feed-in level to the debutting section or station C where each serially presented corn ear is engaged at a relatively high level at the undersides of its cross-section by debutting wheels which immediately change the course of travel of the ears from horizontal-longitudinal, to vertical-downward or transverse, still maintaining the horizontal position of each corn ear and causing it to pass between and be accurately debutted by rotating debutting knives disposed to make a cross-cut perpendicular to the longitudinal axis of the corn ear and at the grain shoulder, without mutilating or cutting of any portion of the grain rows.

The debutting wheels deliver the corn ears rapidly downwardly, still in horizontal position, and the ears thus delivered are immediately received in a director-way D defined between an opposing pair of director walls which converge slightly downward and inward and are rapidly oscillated and are formed and adapted to gently and very accurately deposit the corn ears, one-by-one onto a downwardly and forwardly inclined director chute and from there, tip end foremost away from the cooperating director walls and onto the receiving ends of a pair of cooperating husking rolls at the husking station or section E. In this manner the positioning of the corn ears always is under complete control and the longitudinal axes of the ears are maintained, from initial entry through complete husking, substantially in the vertical plane in which the "bite"

of the husking roll lies, the presentation of each ear being with its longitudinal axis inclined slightly downward and forward with relation to the downward and forward inclination of the husking rows, and with each corn ear tip presented directly into the husking roll "bite."

Another feature of the invention is the presentation in conjunction with the debutting section C and the corn ear director way D of novel means for assuring against objectionable accumulation of corn silk and ribbons beneath and in the area of the debutting knives, this being accomplished in the area F.

Describing the machine structures more specifically, attention is first directed to FIGURES 1, 2, 6 and 10 of the drawings. The machine includes a base framing 5 and upper side frame portions 6 from which supporting bracket means 7 project and upon which the feed way or table 8 of the above-mentioned feed-in section A is supported. The feed means for said section A includes an endless feed chain means 9 passing over an idler 10 and a drive sprocket 11 to present a horizontal end feed flight along the table 8. A one piece guide wall 12 extends along each side of the table 8, the same having arcuate extensions 13 adjacent and beyond the driver sprocket 11, said extensions having portions 14 extending over the feed rolls which receive the corn ears from the chain and which also overlap the presser rolls to be referred to in detail hereinafter and which are located at the previously mentioned aligning section B, as shown in FIGURES 6 and 10.

From the chain means 9 the corn ears pass onto opposed pairs of angularly disposed feeder rolls 15 best shown in FIGURES 5, 6, 9 and 10. The rolls are carried on downwardly and inwardly inclined shafts 16, rotatable in housings 17 which are mounted at 18 for swinging movement in a vertical plane about driver shafts 19, and being driven by worm gear coupling at 20 from said driver shafts, and urged upwardly by anchored retractile spring means 21, the upward swinging movement being limited by stop means 22. From said rolls 15 the corn ears pass onto a cooperating pair of aligner rolls 23 and under a coperating pair of presser rolls 24, one presser roll overlying and cooperating with each aligner roll, said rolls being best illustrated in FIGURES 5, 6, 9 and 15.

Each aligner roll 23 is fixed on the inner end of a downwardly and inwardly inclined shaft 25 which is rotatable in a housing 26 fixed on the framing at 27 and driven by a bevel gear couple 28 from an upright driver shaft 29 which is in turn driven through a spiral worm gear or couple 30 from one of the two parallel driven shafts 31.

Each presser roll 24 is fixed on a shaft 32 which is rotatable in a housing 33 which is rockably mounted at 34 on one of the previously mentioned shafts 19, the presser wheel carrying shafts being driven from said shafts 19 through worm gear coupling at 35. The aligner roll shafts 25 are connected through known rack-sector-crank and link connections 36, with crank means 37 carried by the respective presser wheel support housings 33, a known variable eccentric stop coupding being provided at 38. This arrangement operates through the mentioned connecting linkage to cause the aligner rolls 23 to move apart as the associated or overlying presser wheels 24 are lifted by the passing corn ears, and to move toward each other as said presser wheels are lowered. However, the linkage provides lost motion permitting downward movement of the presser wheels at times without accompanying relative movement of the aligner rolls, and the adjustment of the variable stop means may be utilized to adjust the cooperative relation and the ratio of movements of the cooperating aligner and presser wheels. Stop means 39 are provided for limiting downward swinging movement of the presser roll carrying housings 33.

Each presser roll housing has a presser plate 40 rigidly secured thereon at 41 to move upwardly and downwardly therewith, and a retarder plate 42 is pivotally supported at 43 on a frame carried bracket 44 in cooperative relation beneath each presser plate, anchored retractile springs 45 best shown in FIGURE 9 serving to yieldably urge the plates 42 upwardly toward the adjustable stops 46 carried by the overlying presser plate means.

Describing the means for driving the parts thus far mentioned herein, attention is directed to the power source motor 47. See FIGURES 1, 2, 6 and 8. The drive shaft 48 of the motor carries a small gear 49 meshing with the large gear 50 mounted on the shaft 51 and having the husker roll drive worm gear 52 thereon, the driving sprocket 53 and also the inching wheel 54.

The sprocket 53, through chain 55, drives the jack shaft 56 through the driven sprocket 57, and the shaft 56 also carries a driver sprocket 58 which, through the chain 59 passing over the tightener 60, drives the cross-shaft 61 by engaging over the sprocket 62 thereon. The shaft 61 acts through worm couples 63 to drive the previously mentioned shafts 31 arranged in parallel relation along the sides of the machine, and said shaft 61 also drives the previously mentioned parallel shafts 19 through the worm gear couplings 64.

Figure 7:
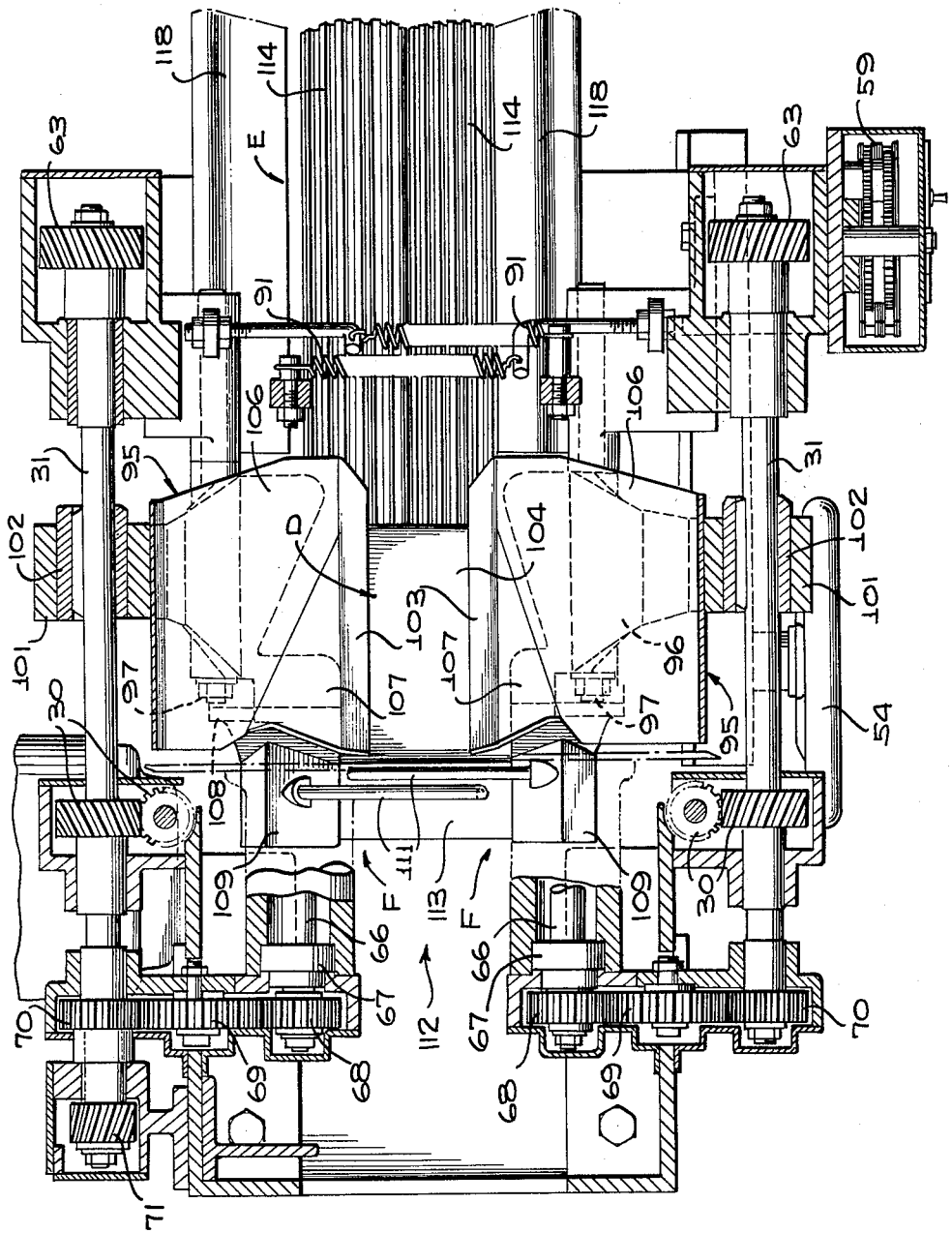
FIGURE 7 is an enlarged horizontal section taken on the line 7—7 on FIGURE 6.

Passing through the opposing pairs of the upper and lower cooperating presser rolls 24 and aligner rolls 23 the corn ears are presented in horizontal position at the debutting section or station C best shown in FIGURES 3, 4, 6, 14, 15 and 17. At this station the individually presented corn ears first pass over a pair of cooperating rotary debutting knives 65 which are secured on shafts 66 rotatably mounted at 67 on the machine framing and each having a gear 68 thereon to which rotation is imparted through an idler gear 69 and a driver gear 70 on the respective shaft 31. The shaft 31 extending along the left side of the machine also carries a driver worm 71 which acts through the meshing worm 72 to drive the shaft 73 which carries the feed-in chain drive sprocket 11, as shown in FIGURES 7 and 10.

In passing over the debutting knives 65 the corn ears are received over the debutting wheels each including a hub 74 and two parallel spaced wheel disks, a front disk 75 and a rearmost disk 76. Each debutting wheel hub 74 is secured on a shaft 77 which is rotatably mounted at 78 in a carrier 79 which is mounted at 80 on a shaft 81 rotatably supported at 82 on the framing and in the before mentioned cross bracket 44, as shown in FIGURES 3, 4, 6 and 8. Each of the carriers 79 includes a housing portion 83, and each housing portion encloses a driver gear 84 on the respective shaft 81, an intermediate idler gear 85 and the driven gear 86 fixed on the respective debutting wheel shaft 77. Each shaft 81 has a driven gear 87 fixed thereon, the same being driven through an intermediate gear 88 from a driver gear 89 on the respective side shaft 19. See FIGURE 4.

Swinging movement of the housing 83 about the axes of the shafts 81, or in other words swinging movement of the debutting wheels toward each other, is limited by stop means 90, gravity action serving to bring the wheels together, and the anchored retractile light spring means 91 constantly tend to move the wheels to the stop limit spacing, and serving to prevent rebound action.

An important feature of the present invention is the relatively wide spacing and relatively high positioning of the debutting wheels 74, 75, 76. The debutting knives 65 also are placed higher than was the practice in previously known machines, and this particular arrangement of the debutting wheels and knives serves to provide marked advantage in the rapid, controlled handling of the corn ears, as will be described hereinafter.

The disks 75 and 76 of the debutting wheels are provided with equidistantly spaced, radially projected corn ear engaging teeth 92, and each tooth is defined at its trailing side by an arcuate, ear support portion 93 effective to support a corn ear in the manner illustrated in FIGURE 17 as it is being moved through the debutting knives 65, the arcuate portions 93 serving to protect against damaging engagement of the corn ears against the wheel disks or the teeth thereon. It will be noted also by reference to FIGURES 3, 8 and 16 of the drawings that the teeth on the rearmost disks 76 are stepped slightly ahead of the teeth on the front disks 75 and are of slightly larger diameter so that they engage the corn ears slightly in advance of engagement thereof by the teeth on the front disks 75. See 94 in FIGURE 16.

It is to be understood that the aligner rolls 23, the presser rolls 24 and the debutting wheels 74, 75, 76, are driven at substantially the same peripheral speed, a speed greater than the speed of linear movement of the feed-in chain 9 and the feed rolls 15. Thus the corn ears are fed into the machine by the chain means 9 and feeder rolls 15 at one speed, and are moved by the rolls 23, and the wheels 74–75–76 at a second and greater speed, assuring very rapid handling of the corn ears and such longitudinal spacing thereof as they leave the feed chain means 9 as to assure against any over lapping or piling up of the corn ears.

It has been a practice heretofore to cause the corn ears moving into position over the debutting wheels to follow approximately 90° about the aligner rolls, said roll contours being thus followed by the grain shoulder on each corn ear prior to grasping of the corn ear by the debutting wheels and moving the same down through the debutting knives. In the machine part arrangement herein disclosed however, the wide spacing and relatively high positioning of the debutting wheels and debutting knives as previously described, serve to cause the corn ears to follow a substantially right-angular course, changing from horizontal-longitudinal to vertical-transverse as indicated at T in FIGURE 14. This results from the fact that the high placement of the debutting wheels causes the wheels to first engage the corn ears as indicated in FIGURE 15 at relatively high side points on each corn ear regardless of ear size, the presser roll and aligner roll moving means being so correlated as to permit very limited amount only of travel of a corn ear grain shoulder about the aligner rolls, as indicated at S in FIGURE 14, with a resultant very limited down thrust by the pressure plates 40 being effective to present the corn ear to the high placed debutting wheels so that they will immediately take over vertical-transverse downward feeding of a corn ear through the debutting knives without any substantial prior deviation of the horizontal corn ear from its feed-in plane level.

Figure 1:
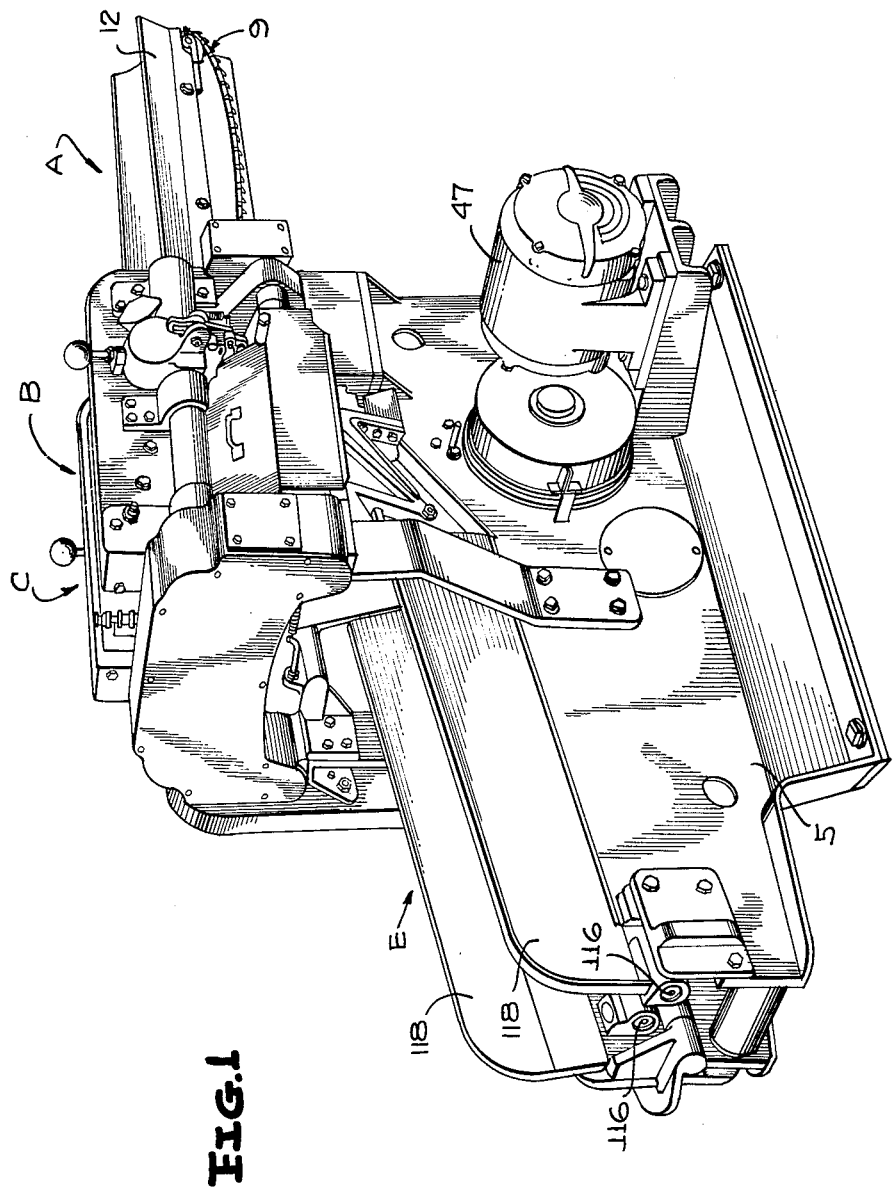
FIGURE 1 is a perspective view illustrating the machine structure in which the invention is embodied.
Figure 2:
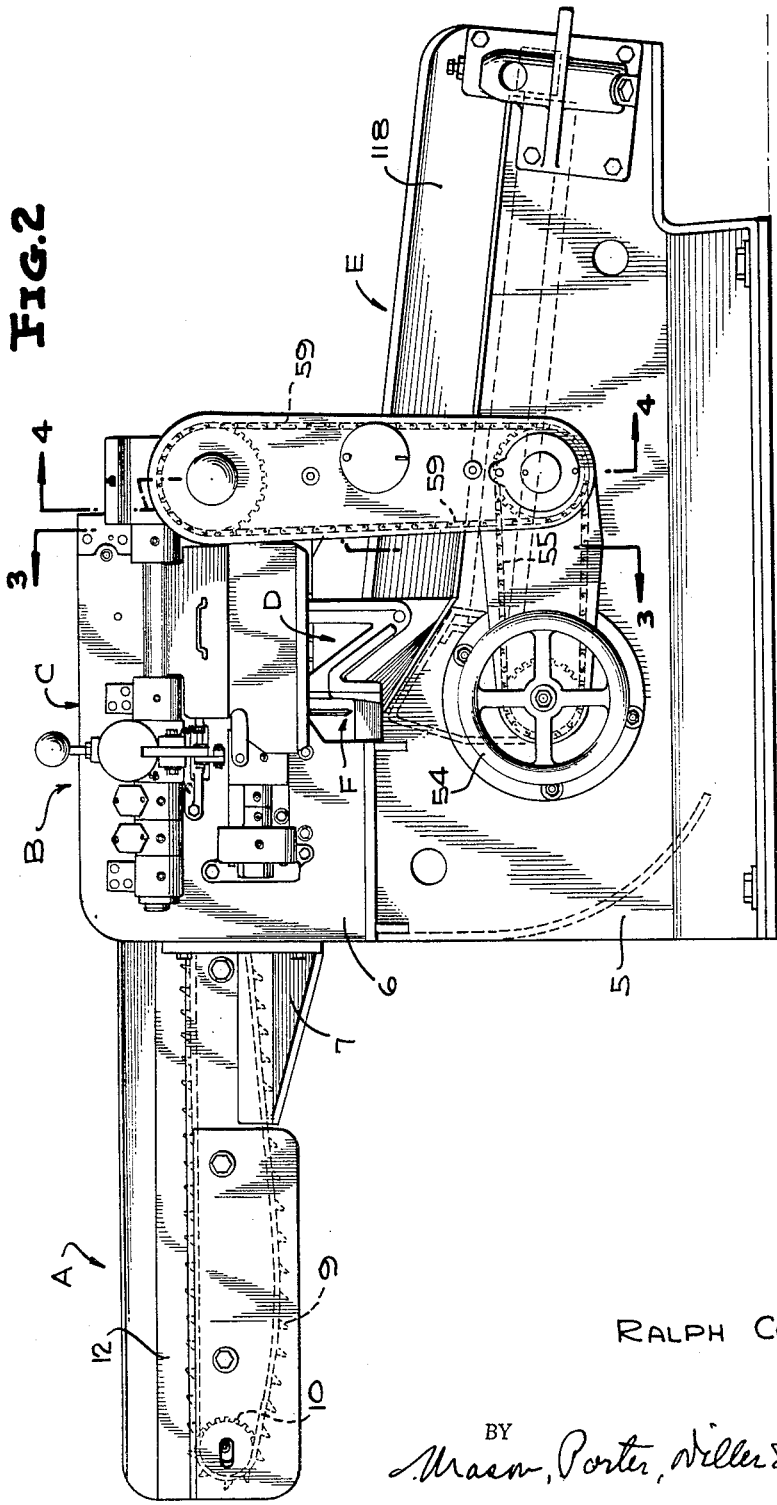
FIGURE 2 is a right-hand side elevation showing the machine side opposite that viewed in FIGURE 1.
Figure 3:
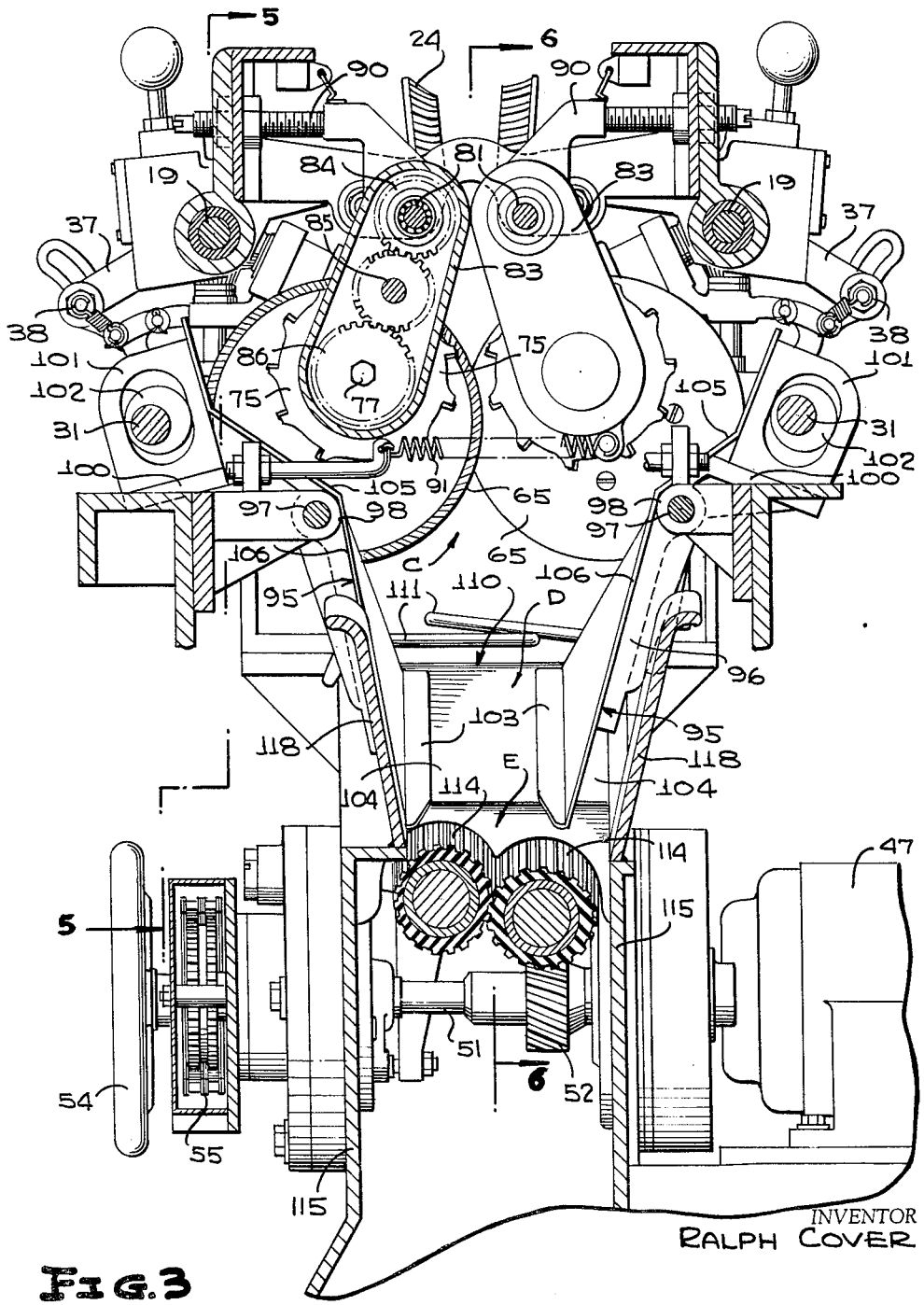
FIGURE 3 is an enlarged vertical cross-section taken on the line 3—3 on FIGURE 2.
Figure 4:
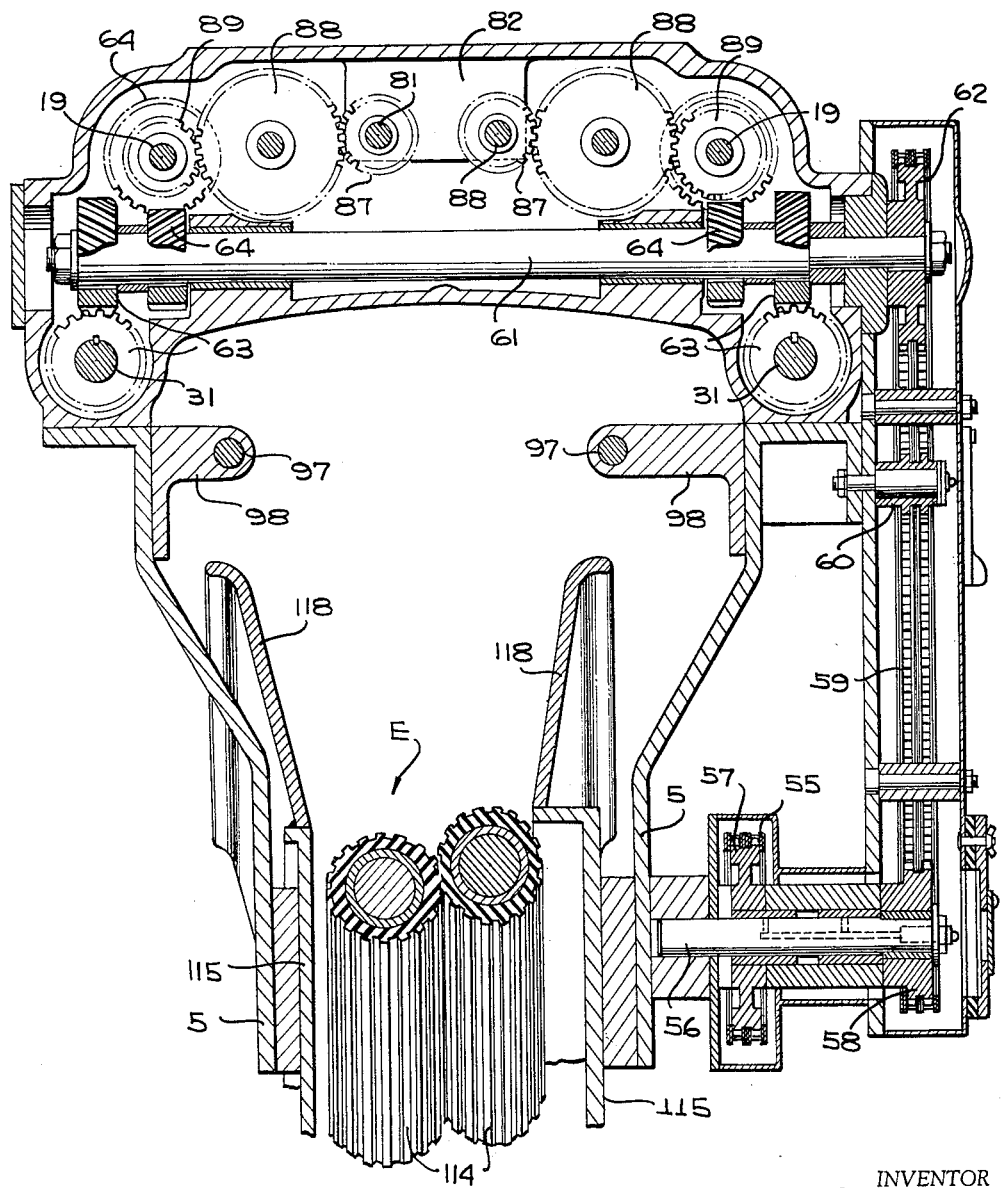
FIGURE 4 is an enlarged vertical cross-section taken on the line 4—4 on FIGURE 2.
Figure 5:
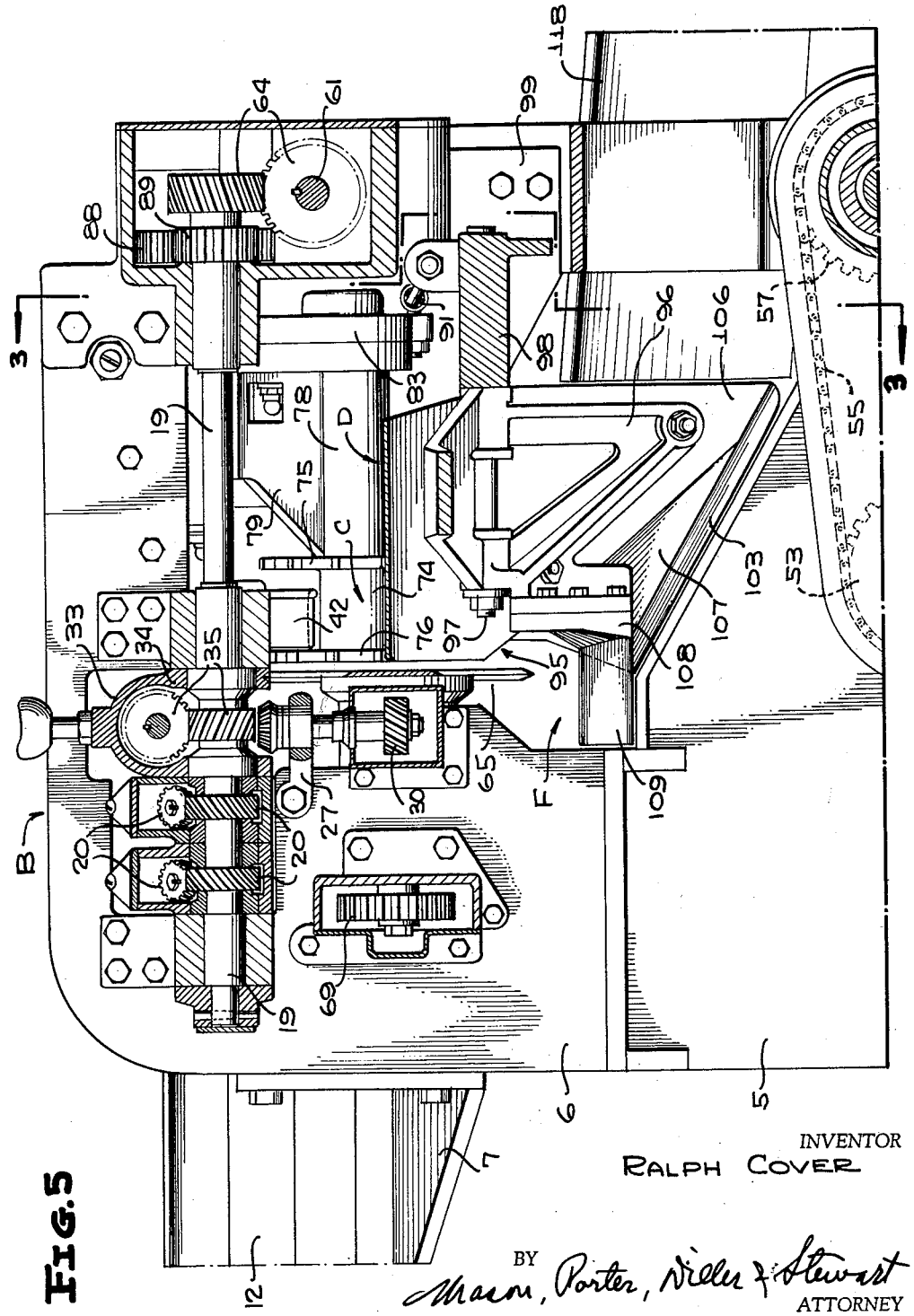
FIGURE 5 is an enlarged vertical longitudinal section taken on the line 5—5 on FIGURE 3.

The corn ears are forced rapidly downward through the debutting knives 65 by the debutting wheels and are delivered, still with their longitudinal axes horizontally disposed and in the vertical plane in which the co-acting portions of the husking rolls are located into the director way D best shown in FIGURES 3, 5, 6, 7 and 8. In the director way D the corn ears are received between the opposing, rapidly oscillated director walls generally designated 95, the same being secured to brackets or carriers 96 which are rockable about shafts 97 mounted in supporting members 98 which are secured at 99 on the framing. Each bracket 96 includes a support extension 100 whereon is mounted a yoke 101 through which one of the side shafts 31 extends, an eccentric 102 being secured on each shaft within the respective yoke and engaged therein in the manner illustrated in FIGURES 7 and 8 so that rotation of the shafts 31 will impart the desired oscillation or vibratory movement to the director walls 95. It will be noted by reference to FIGURES 3 and 8 that the levers provided by differential spacing of the shafts 31 and the respective cooperating shafts 97 are of different lengths, with the result that differential vibration is imparted to the director walls 95. At their free lower ends the director walls 95 are turned inward in the form of right-angled delivery flanges 103 which swing closely over a forwardly and downwardly inclined chute 104 which delivers onto the husking rolls as illustrated in FIGURES 3 and 6.

The director walls generally designated 95 have flared upper portions 105 which merge downwardly into downwardly and inwardly converging main body portions 106 the foremost portions of which merge directly into the flanges 103, and said director walls also include rearward generally triangular portions 107 which merge into the flanges 103 in accelerated convergence, thus providing retarders tending to turn the trailing corn ear portions from their horizontal axis position to a position paralleling the incline of the chute 104.

Attached at 101 to each director wall carrying bracket 96 for rapid vibration with the director wall in the previously mentioned area F is an inverted V-shaped member 109. It will be observed by reference to FIGURES 6 and 7 that the members 109 are disposed to oscillate generally in the transverse plane occupied by the crest 110 of the chute 104. A corn husk ribbon and corn silk clearing pin 111 projects inward from each inverted V-shaped member 109, said pins lying in closely spaced transverse parallel planes adjacent and rearward of the chute crest 110, as best shown in FIGURES 6, 7 and 8.

By reason of the described arrangement of the parts, the debutted corn ears only fall into the chute or plate 104, and the knife severed butts fall to the left of the chute crest 110 and fall into the trash-receiving portion 112 to the left of the wall 113, as viewed in FIGURE 6.

As previously described, and as clearly shown in FIGURES 3, 6 and 7, the director members generally designated 95 and the chute 104 serve to deliver the debutted corn ears in accurately centered, tip foremost and slightly downwardly inclined relation into the "bite" of the husking rolls at the husking station E.

The longitudinally ribbed, elliptical sectioned husking rolls 114 are disposed on a slight downward and forward incline between the frame wall portions 115, being rotatably supported at 116, as shown in FIGURE 6, and worm gear coupled at 117 to rotate in unison, being driven by the driver gear 52 as shown in FIGURES 3, 6 and 8. Outwardly and upwardly flaring rigid side walls 118 are supported by the framing to extend above the husking rolls at each side, as shown in FIGURES 1 to 4.

By reason of the controlled and accurately guided delivery of the debutted corn ears, tip end foremost and slightly inclined with relation to the downwardly and forwardly inclined husking rolls, with accurate placement into the "bite" of the husking rolls to the receiving ends thereof, the husking action is immediate and each ear goes on its way before there is any possibility whatever of a next feeding ear falling thereon, or even for contacting the same so as to cause any deflection from the intended axial discharge course along and off the husking rolls.

*Operation*

Recapitulating the operation of the machine, attention is directed to FIGURES 6, 7, 3, 8, 14, 15 and 17 of the drawings. The corn ears are fed along horizontally in the direction of their longitudinal axes by the feed chain means 9, in processional order and at a rate of about 145 to 150 feet per minute, being delivered first onto the feeder rolls 15, 15, then between the cooperating aligner rolls 23 and presser rolls 24 and then over the debutting knives 65 and debutting wheel disks 75, 76 and into position between the cooperating presser plates 40 and the underlying retarder plates 42. Upon leaving the chain means 9 and feeder rolls 15, 15, the speed of movement of the corn ears in increased from the previously stated rate of 145 to 150 feet per minute to a greater speed, say 240 feet per minute, the driving devices being so constructed and arranged as to synchronize the peripheral speeds of the aligner rolls 23 and cooperating presser wheels 24 and the debutting wheels 74–75–76 at the last mentioned rate, thereby to assure proper spacing ahead of each corn ear with relation to the next oncoming ear and avoid all possibility of overlapping or piling up of corn ears in following sections or stations of the machine.

It is an important purpose of the present invention to speed up the machine operation and increase its corn ear control and husking efficiency as compared to prior known machines, and this is in part accomplished by causing the ear travel path to be substantially right angular, as shown at T in FIGURE 14. As each corn ear grain shoulder GS passes over the crest of the aligner rolls and just starts to deviate downward at S from its horizontal infeed level or plane, the corn ear will be in proper position over the debutting wheel 74–75–76 so that the very slight depression of the ear by the presser plates 40 resisted by the spring lifted retarder plates 42 will assure the immediate taking over of control and feeding of the corn ear by said wheels, as shown in FIGURES 15 and 17. The relatively widely spaced wheels grasp the corn ear at high points on its under sides and, without any deviation whatever from its horizontal axis position, delivers said ear to and through the debutting knives 65, assuring an accurate debutting cut perpendicularly across the corn ear axis, without any grain cutting or mutilation.

The corn ear debutting being thus completed, the corn ear is delivered by the debutting wheels to fall into the director-way D to be controlled and guided therein by director members 95 and passed on to the husking rolls. It should be apparent that the corn ears are not free-falling into the director-way D but rather are in controlled guide motion, being gently and successively patted side-to-side in falling between the director member wall portions 105—106, 107—107, and finally being placed gently and in full position control by the terminal flanges 103 on the chute 104 to slide therefrom onto the receiving ends of the husking rolls 114—114 in centered position relative to the husking roll "bite" and at just the right downward and forward inclination relative to the husking rolls, as previously described. It has been pointed out herein that the converging director walls are spaced to permit the largest corn ears to pass therebetween onto the chute means, and it is to be understood that the wall arrangement and the functioning thereof is such that this director means will not accommodate two ears at the same time. Therefore, the ears are delivered one by one onto the chute means and into the husking roll "bite."

During operation of this machine all of the previously objectionable trash or husk ribbon and corn silk accumulation in the area beneath the debutting knives and wheels is eliminated, the husk ribbons and corn silk which otherwise would objectionably pile up being received on, vibrated and removed to fall harmlessly away, by action of the vibrating inverted V-shaped members 109 and fingers 111.

While preferred part structures, combinations and arrangements have been disclosed herein for accomplishing the stated objects, it is to be understood that variations in such parts and arrangements may be made without departing from the spirit and scope of the invention as defined in the accompanying claims.

I claim:

1. In a corn husking machine, husking rolls disposed on a downward incline and having cooperating rotating surfaces presenting a corn ear receiving "bite" and between which husks on the corn ears engage to be rapidly stripped from the corn ears, said "bite" including an upper husk bearing corn ear receiving end and a lower husked corn ear delivering end, corn ear directing means disposed at a higher elevation than and in advance of the husking rolls for delivering debutted corn ears to follow serially downward at a point in advance of the receiving end of the roll "bite" and with their longitudinal axes horizontally disposed, and receiving chute means placed to receive each falling ear individually and positioned on a downward incline effective to direct each ear tip end foremost into the receiving end of the roll "bite" and with its longitudinal axis inclined slightly forward and downward with relation to the roll "bite," said corn ear directing means including means repeatedly patting each falling ear at each side to control the falling thereof and accurately direct the same onto the chute means to pass therefrom directly into the receiving end of the roll "bite."

2. Apparatus as defined in claim 1 wherein the corn ear patting and directing means includes devices for changing the position of each falling ear from horizontal to an inclined position in which the corn ear longitudinal axis substantially parallels the receiving chute means at the time the corn ear is placed thereon.

3. Apparatus as defined in claim 1 wherein the corn ear patting and directing means includes a pair of opposed downwardly and inwardly converging rapidly oscillated walls.

4. Apparatus as defined in claim 1 wherein the corn ear patting and directing means includes a pair of opposed downwardly and inwardly converging rapidly oscillated walls terminating at their lower ends in opposing inwardly turned flanges generally paralleling and movable in close proximity to the inclined chute means.

5. Apparatus as defined in claim 1 wherein the corn ear patting and directing means includes a pair of opposed downwardly and inwardly converging rapidly oscillated walls having thereon portions of accelerated convergence engageable by trailing end portions of falling ears and effective to so retard and control the falling action as to change the position of each falling ear from horizontal to an inclined position in which the corn ear longitudinal axis substantially parallels the receiving chute means at the time the corn ear is placed thereon.

6. Apparatus as defined in claim 1 wherein the corn ear patting and directing means includes a pair of opposed downwardly and inwardly converging rapidly oscillated walls terminating at their lower ends in opposing inwardly turned flanges generally paralleling and movable in close proximity to the inclined chute means, said oscillated walls also having thereon portions of accelerated convergence engageable by trailing end portions of falling ears and effective to so retard and control the falling action as to change the position of each falling ear from horizontal to an inclined position in which the corn ear longitudinal axis substantially parallels the receiving chute means at the time the corn ear is placed thereon.

7. Apparatus as defined in claim 1 wherein the corn ear patting and directing means include portions extending a limited distance beyond the delivery point of the inclined chute means and over the receiving end of the roll "bite."

8. Apparatus as defined in claim 1 wherein the corn ear patting and directing means includes a pair of opposed downwardly and inwardly converging rapidly oscillated walls terminating at their lower ends in opposing inwardly turned flanges generally paralleling and movable in close proximity to the inclined chute means, said oscillated walls also having thereon portions of accelerated convergence engageable by trailing end portions of falling ears and effective to so retard and control the falling action as to change the position of each falling ear from horizontal to an inclined position in which the corn ear longitudinal axis substantially parallels the receiving chute means at the time the corn ear is placed thereon, said oscillated walls extending a limited distance beyond the delivery point of the inclined chute means and over the receiving end of the roll "bite."

9. Apparatus as defined in claim 1 wherein there are included means movable with the corn ear patting and directing means and positioned to receive thereon and dispose of husk ribbons and corn silk falling with corn ears, thereby to prevent accumulation of such trash in the area adjacent the inclined chute means.

10. Apparatus as defined in claim 1 wherein the corn ear patting and directing means includes a pair of opposed downwardly and inwardly converging rapidly oscillated walls, and wherein there are included means movable with the oscillated walls and positioned to receive thereon and by vibration dispose of husk ribbons and corn silk falling with corn ears, thereby to prevent accumulation of such trash in the area adjacent the inclined chute means.

11. Apparatus as defined in claim 1 wherein there are included means movable with the corn ear patting and directing means and positioned to receive thereon and dispose of husk ribbons and corn silk falling with corn ears, thereby to prevent accumulation of such trash in the area adjacent the inclined chute means, said last named means comprising an inverted V-shaped member transversely oscillated at each side of the inclined chute means adjacent the receiving end thereof, and a clearing pin projecting inwardly from each V-shaped member in a generally horizontal position, said pins being disposed to oscillate in adjacent generally parallel upright planes.

12. Apparatus as defined in claim 1 wherein the corn ear patting and directing means includes a pair of opposed downwardly and inwardly converging rapidly oscillated walls, and wherein there are included means movable with the oscillated walls and positioned to receive thereon and by vibration dispose of husk ribbons and corn silk falling with corn ears, thereby to prevent accumulation of such trash in the area adjacent the inclined chute means, said last named means comprising an inverted V-shaped member transversely oscillated at each side of the inclined chute means adjacent the receiving end thereof, and a clearing pin projecting inwardly from each V-shaped member in a generally horizontal position, said pins being disposed to oscillate in adjacent generally parallel upright planes.

13. Apparatus as defined in claim 1 wherein the means for delivering the corn ears serially downward include horizontally disposed and opposed debutting wheel means and cooperating debutting knife means through which said wheels move the corn ears in a debutting action, and wherein there are included means movable with the corn ear patting and directing means and positioned to receive thereon and dispose of husk ribbons and corn silk falling with corn ears or from the debutting wheels and knife means, thereby to prevent accumulation of such trash in the area beneath the knife means and adjacent the inclined chute means.

14. Apparatus as defined in claim 1 wherein the means for delivering the corn ears serially downward include horizontally disposed and opposed debutting wheel means and cooperating debutting knife means through which said wheels move the corn ears in a debutting action, and wherein the corn ear patting and directing means includes a pair of opposed downwardly and inwardly converging rapidly oscillated walls, and there are included means movable with the oscillated walls and positioned to receive thereon and by vibration dispose of husk ribbons and corn silk falling with corn ears or from the debutting wheels and knife means, thereby to prevent accumulation of such trash in the area beneath the knife means and adjacent the inclined chute means.

15. Apparatus as defined in claim 1 wherein the means for delivering the corn ears serially downward include horizontally disposed and opposed debutting wheel means and cooperating debutting knife means through which said wheels move the corn ears in a debutting action, and wherein there are included means movable with the corn ear patting and directing means and positioned to receive thereon and dispose of husk ribbons and corn silk falling with corn ears or from the debutting wheels and knife means, thereby to prevent accumulation of such trash in the area beneath the knife means and adjacent the inclined chute means, said last named means comprising an inverted V-shaped member transversely oscillated at each side of the inclined chute means adjacent the receiving end thereof, and a clearing pin projecting inwardly from each V-shaped member in a generally horizontal position, said pins being disposed to oscillate in adjacent generally parallel upright planes.

16. Apparatus as defined in claim 1 wherein the means for delivering the corn ears serially downward include horizontally disposed and opposed debutting wheel means and cooperating debutting knife means through which said wheels move the corn ears in a debutting action, and wherein the corn ear patting and directing means includes a pair of opposed downwardly and inwardly converging rapidly oscillated walls, and there are included means movable with the oscillated walls and positioned to receive thereon and by vibration dispose of husk ribbons and corn silk falling with corn ears or from the debutting wheels and knife means, thereby to prevent accumulation of such trash in the area beneath the knife means and adjacent the inclined chute means, said last named means comprising an inverted V-shaped member transversely oscillated at each side of the inclined chute means adjacent the receiving end thereof, and a clearing pin projecting inwardly from each V-shaped member in a generally horizontal position, said pins being disposed to oscillate in adjacent generally parallel upright planes.

17. Apparatus as defined in claim 1 wherein the means for delivering the corn ears serially downward include horizontally disposed and opposed debutting wheel means and cooperating debutting knife means through which said wheels move the corn ears in a debutting action, and wherein there are included means movable with the corn ear patting and directing means and positioned to receive thereon and dispose of husk ribbons and corn silk falling with corn ears or from the debutting wheels and knife means, thereby to prevent accumulation of such trash in the area beneath the knife means and adjacent the inclined chute means, and there also being included means for driving the corn ear patting means and the debutting wheel means in timed relation.

18. Apparatus as defined in claim 1 wherein the means for delivering the corn ears serially downward include horizontally disposed and opposed debutting wheel means and cooperating debutting knife means through which said wheels move the corn ears in a debutting action, and wherein the corn ear patting and directing means includes a pair of opposed downwardly and inwardly converging rapidly oscillated walls, and there are included means movable with the oscillated walls and positioned to receive thereon and by vibration dispose of husk ribbons and corn silk falling with corn ears or from the debutting wheels and knife means, thereby to prevent accumulation of such trash in the area beneath the knife means and adjacent the inclined chute means, and there also being included means for oscillating the walls in time relation to the rotation of the debutting wheels.

19. Apparatus as defined in claim 1 wherein the means for delivering the corn ears serially downward include horizontally disposed and opposed debutting wheel means and cooperating debutting knife means through which said wheels move the corn ears in a debutting action, and wherein the corn ear patting and directing means includes a pair of opposed downwardly and inwardly converging rapidly oscillated walls, and there are included means movable with the oscillated walls and positioned to receive thereon and by vibration dispose of husk ribbons and corn silk falling with corn ears or from the debutting wheels and knife means, thereby to prevent accumulation of such trash in the area beneath the knife means and adjacent the inclined chute means, and there also being included means for oscillating the walls in timed relation to the rotation of the debutting wheels with each said wall partaking of an independent and different oscillation.

20. Apparatus as defined in claim 1 wherein the means for delivering the corn ears serially downward include horizontally disposed and opposed debutting wheel means and cooperating debutting knife means through which said wheels move the corn ears in a debutting action, and wherein the corn ear patting and directing means includes a pair of opposed downwardly and inwardly converging rapidly oscillated walls, and there are included means movable with the oscillated walls and positioned to receive thereon and by vibration dispose of husk ribbons and corn silk falling with corn ears or from the debutting wheels and knife means, thereby to prevent accumulation of such trash in the area beneath the knife means and adjacent the inclined chute means, and there also being included means for oscillating the walls in timed relation to the rotation of the debutting wheels and a driving yoke projecting from each said wall, and said last named means including a driver shaft associated with each wall and an eccentric thereon engaged in the particular driver yoke.

21. Apparatus as defined in claim 1 wherein the means for delivering the corn ears serially downward include horizontally disposed and opposed debutting wheel means and cooperating debutting knife means through which said wheels move the corn ears in a debutting action, and wherein the corn ear patting and directing means includes a pair of opposed downwardly and inwardly converging rapidly oscillated walls, and there are included means movable with the oscillated walls and positioned to receive thereon and by vibration dispose of husk ribbons and corn silk falling with corn ears or from the debutting wheels and knife means, thereby to prevent accumulation of such trash in the area beneath the knife means and adjacent the inclined chute means, and there also being included means for oscillating the walls in timed relation to the rotation of the debutting wheels and a driving yoke projecting from each said wall, and said last named means including a driver shaft associated with each wall and an eccentric thereon engaged in the particular driver yoke, the yokes being spaced different distances from the centers of oscillation of the respective walls thereby to present unequal movement imparting levers acted upon by the eccentrics and provide for differential oscillation of the respective walls.

22. In a corn husking machine, opposed debutting wheel means disposed to rotate about horizontal axes, debutting knife means disposed in cooperative relation to the debutting wheel means to be effective in debutting husk bearing corn ears when moved therethrough by the debutting wheel means, means for feeding corn ears rapidly into the machine and individually into position over the debutting wheel means in processional order and in horizontal generally longitudinal alignment with their supported diameter bottoms on a common plane, retarder plate means associated with the debutting wheel means for supporting each corn ear presented thereto in a horizontal position substantially coplanar with said feeding plane, the debutting wheel means and the debutting knife means being placed to engage the corn ears approximately at said abovementioned feeding plane and spaced apart a distance to make them effective to grasp each corn ear immediately upon said corn ear coming into position thereover and change the travel course of said ear from horizontal-longitudinal to vertical-transverse downwardly through the knife means to fall still in horizontal position below the debutting wheel means.

23. Corn husking machine structure as defined in claim 22 wherein are included longitudinally disposed husking rolls inclined to present a "bite" including an upper receiving end and a lower delivery end, and fall controlling and directing means disposed beneath the debutting wheel means and adjacent and in advance of the receiving end of the roll "bite" to receive each falling ear and very accurately and gently place it tip first and at a slight forward and downward inclined relation to the rolls directly into the receiving end of the roll "bite."

24. Corn husking machine structure as defined in claim 22 wherein are included longitudinally disposed husking rolls inclined to present a "bite" including an upper receiving end and a lower delivery end, and fall controlling and directing means disposed beneath the debutting wheel means and adjacent the receiving end of the roll "bite" to receive each falling ear and very accurately and gently place it tip first and at a slight forward and downward inclined relation to the rolls directly into the receiving end of the roll "bite", there also being associated with said fall controlling and directing means vibratory devices effective to receive and dispose of falling husk ribbons and corn silk and prevent accumulation thereof in the area beneath the debutting wheel and knife means.

25. Corn husker machine structure as defined in claim 22 wherein the means for feeding the corn ears includes a feeder chain, opposed feed roll means, opposed aligner roll means and presser roll means overlying and cooperating with the aligner roll means, and means for driving the chain and the feed roll means to be effective in moving the corn ears at one speed and for driving the aligner and presser roll means and the debutting wheel means to be effective in moving the corn ears at another and greater speed.

26. Corn husker machine structure as defined in claim 22 wherein the means for feeding the corn ears includes a feeder chain, opposed feeder roll means, opposed aligner roll means and presser roll means overlying and cooperating with the aligner roll means, and there also being included a single piece corn ear guiding rail extending along each side of the feeder chain, over the feeder roll means and to the location of the aligner roll means and presser roll means axes.

27. In a corn husking machine, opposed debutting wheel means disposed to rotate about horizontal axes, debutting knife means disposed in cooperative relation to the debutting wheel means to be effective in debutting husk bearing corn ears when moved therethrough by the debutting wheel means, means for feeding corn ears rapidly into the machine and individually into position over the debutting wheel means in processional order and in horizontal generally longitudinal alignment with their supported diameter bottoms on a common plane, presser plate means movable with the presser wheel means upwardly and downwardly in accordance with variations in cross section and positioning of infeeding corn ears, retarder plate means underlying the presser plate means and associated with the debutting wheel means for supporting each corn ear in horizontal position substantially coplanar with said feeding plane and acting when a corn ear engages between them and the presser plates to tend to hold the ear back against the aligner roll means and cause the grain shoulder at the butt end of the ear to tend to follow a very short distance along the circumference of the aligner roll means with an attendant very slight lowering of the presser plate means with the latter imparting slight downward movement to the corn ear in its horizontal position, variable means for causing the aligner roll means to move apart and toward each other correspondingly as the presser roll means moves up and down, the debutting wheel means and the debutting knife means being placed and spaced apart a distance to make them effective to grasp each corn ear immediately upon said corn ear coming into position thereover, said presser and aligner roll moving means being so correlated as to permit the imparting to a corn ear of said limited downward movement by the presser plate means incidental to said very short distance of following of the corn ear grain shoulder along the aligner roll means unattended by any substantial change in position of the aligner roll means, and said very short distance of corn ear depression by the presser plate means being sufficient to present the corn ear to the debutting wheel means and the debutting knife means so that they will immediately take over vertical-transverse feeding of the corn ear down through the debutting knives and between the aligner roll means without any substantial prior deviation of the horizontal corn ear from its feed-in plane level, thereby to provide a substantially right angularly travel path for the corn ears in passing to and through the debutting wheel means and the debutting knife means.

28. Corn husking machine structure as defined in claim 22 wherein the debutting wheel means comprises a pair of opposed rotary wheels each including a hub and two spaced disks and means mounting said wheels for movement apart and then toward each other a limited distance as a corn ear is moved thereby and therebetween and through the cooperatively placed knife means during rotation of said wheels, said wheel disks having toothed peripheries effective to grasp each corn ear presented to them.

29. Corn husking machine structure as defined in claim 22 wherein the portion of each debutting wheel disk tooth disposed to trail in the direction of rotation merges into the disk through a large radius curve serving as a tooth penetration depth limiting, corn ear contacting guard.

30. Corn husking machine structure as defined in claim 22 wherein the portion of each debutting wheel disk tooth disposed to trail in the direction of rotation merges into the disk through a large radius curve serving as a tooth penetration depth limiting, corn ear contacting guard, and the teeth on a wheel disk placed adjacent the debutting knife means being slightly longer than and stepped slightly ahead of the teeth on the outer disk of said wheel.

31. In a corn husking machine, the combination of corn ear debutting means, elongated cooperating husking rolls presenting a corn ear receiving "bite" in a vertical longitudinal plane, and corn ear directing means disposed at a higher elevation than and in advance of the husking rolls for receiving each individual debutted corn ear directly from the debutting means and accurately directing it to the receiving ends of the husking rolls with its longitudinal axis in the vertical longitudinal plane passing through the roll "bite," said corn ear directing means including a pair of opposed downwardly and inwardly converging rapidly oscillated walls.

32. Corn husking machine structure as defined in claim 31 wherein the directing means includes a pair of opposed downwardly and inwardly converging rapidly oscillated walls, said walls having thereon portions of accelerated convergence engageable by butt end portions of the corn ears and effective to change the position of the corn ears from the position in which they are received from the debutting means to said forwardly and downwardly inclined position in which they are directed into the husking roll "bite."

References Cited in the file of this patent
UNITED STATES PATENTS

| | | |
|---|---|---|
| 773,664 | Moore | Nov. 1, 1904 |
| 1,166,647 | Wolfe | Jan. 4, 1916 |
| 2,329,768 | Kerr | Sept. 21, 1943 |
| 2,358,961 | Cover et al. | Sept. 26, 1944 |